United States Patent
Dierkes et al.

(10) Patent No.: US 10,662,881 B2
(45) Date of Patent: May 26, 2020

(54) OPERATION OF A GAS TURBINE PLANT HAVING A COMPRESSOR AND A TURBINE

(71) Applicant: Siemens Aktiengesellschaft, Munich (DE)

(72) Inventors: Rebecca Dierkes, Gelsenkirchen (DE); Thorsten Engler, Moers (DE); Markus Gorynski, Bochum (DE); Ansgar Sternemann, Herne (DE)

(73) Assignee: Siemens Aktiengesellschaft, Munich (DE)

( * ) Notice: Subject to any disclaimer, the term of this patent is extended or adjusted under 35 U.S.C. 154(b) by 621 days.

(21) Appl. No.: 15/116,607

(22) PCT Filed: Feb. 5, 2015

(86) PCT No.: PCT/EP2015/052400
§ 371 (c)(1),
(2) Date: Aug. 4, 2016

(87) PCT Pub. No.: WO2015/121144
PCT Pub. Date: Aug. 20, 2015

(65) Prior Publication Data
US 2016/0348592 A1    Dec. 1, 2016

(30) Foreign Application Priority Data
Feb. 12, 2014 (EP) .................... 14154804

(51) Int. Cl.
*F02C 9/20* (2006.01)
*F02C 9/28* (2006.01)
(Continued)

(52) U.S. Cl.
CPC .................. *F02C 9/20* (2013.01); *F02C 3/04* (2013.01); *F02C 7/042* (2013.01); *F02C 9/28* (2013.01);
(Continued)

(58) Field of Classification Search
CPC ...... F02C 9/16; F02C 9/20; F02C 9/28; F02C 9/50; F02C 9/54; F02C 3/04; F02C 7/042;
(Continued)

(56) References Cited

U.S. PATENT DOCUMENTS

| 2007/0031238 A1* | 2/2007 | Fujii | .................. F02C 9/20 415/48 |
| 2009/0150040 A1 | 6/2009 | Rofka et al. | |
| 2011/0037276 A1 | 2/2011 | Hoffmann et al. | |

FOREIGN PATENT DOCUMENTS

| EP | 0427952 A1 | 5/1991 |
| EP | 2071157 A1 | 6/2009 |
| WO | 2009109446 A1 | 9/2009 |

OTHER PUBLICATIONS

IPRP (PCT/IPEA/416), dated Apr. 22, 2016, for PCT application No. PCT/EP2015/052400.
(Continued)

*Primary Examiner* — Mark A Laurenzi
*Assistant Examiner* — Loren C Edwards
(74) *Attorney, Agent, or Firm* — Beusse Wolter Sanks & Maire (57) ABSTRACT

A method for operating a gas turbine plant having a compressor and a turbine, where a limit value of a guide blade adjustment for the compressor of the gas turbine is identified depending on at least one drive shaft speed of the gas turbine plant. For the at least one drive shaft speed, a maximum allowable turbine entry temperature corresponding to the limit value of the guide vane adjustment for the compressor or a maximum allowable temperature for the turbine of the gas turbine, which is dependent on the turbine entry temperature, is identified. The gas turbine is operated in con-
(Continued)

sideration of the identified maximum allowable turbine entry temperature or the identified maximum allowable temperature.

11 Claims, 6 Drawing Sheets

(51) Int. Cl.
    *F02C 9/54*     (2006.01)
    *F02C 3/04*     (2006.01)
    *F02C 7/042*     (2006.01)

(52) U.S. Cl.
    CPC ............ *F02C 9/54* (2013.01); *F05D 2240/12* (2013.01); *F05D 2260/81* (2013.01); *F05D 2270/05* (2013.01); *F05D 2270/101* (2013.01); *F05D 2270/112* (2013.01); *F05D 2270/303* (2013.01); *F05D 2270/304* (2013.01); *F05D 2270/305* (2013.01); *F05D 2270/3032* (2013.01); *F05D 2270/311* (2013.01); *F05D 2270/313* (2013.01)

(58) Field of Classification Search
    CPC ............. F05D 2240/12; F05D 2260/81; F05D 2270/05; F05D 2270/101; F05D 2270/112; F05D 2270/303; F05D 2270/304; F05D 2270/305; F05D 2270/311; F05D 2270/313
    USPC .......................................................... 60/779
    See application file for complete search history.

(56) References Cited

OTHER PUBLICATIONS

EP Search Report, dated Aug. 11, 2014, for EP application No. 14154804.0.
International Search Report, dated Mar. 19, 2015, for PCT application No. PCT/EP2015/052400.

\* cited by examiner

OPERATION OF A GAS TURBINE PLANT HAVING A COMPRESSOR AND A TURBINE

CROSS REFERENCE TO RELATED APPLICATIONS

This application is the US National Stage of International Application No. PCT/EP2015/052400 filed Feb. 5, 2015, and claims the benefit thereof. The International Application claims the benefit of European Application No. EP14154804 filed Feb. 12, 2014. All of the applications are incorporated by reference herein in their entirety.

FIELD OF INVENTION

The invention relates to a method for operating a gas turbine plant having a compressor and a turbine and to an arrangement for controlling a gas turbine plant having a compressor and a turbine as well as to a gas turbine plant having a compressor and a turbine.

BACKGROUND OF INVENTION

Gas turbine plants, also called gas turbines for short hereunder, are operated, inter alia, for energy generation in gas power plants. The constructional or process-related design and optimization of gas turbines is usually aimed at reliable operation with maximum efficiency for a base load. One design criterion is a maximum allowable turbine entry temperature as a function of the input material used.

Gas turbine plants or gas turbines are combustion engines, which suck in ambient air, compress this air in a compressor, produce an ignitable flow medium from this compressed ambient air and a fuel in a combustion chamber/burner unit, ignite the same and relax it in a turbine/a turbine unit, wherein a thus released thermal energy is converted into rotational mechanical energy. The mechanical power generated thereby in the turbine, apart from the proportion, which can be utilized for conversion into electric power by means of a generator arranged downstream of the gas turbine plant, is in part passed to the compressor for carrying out compression work.

Based on an operation of the gas turbine for a base load, and in order to for example achieve a full load, an increase in gas turbine output is usually achieved by increasing a compressor intake air mass flow.

Increasing the compressor intake air mass flow is usually achieved by adjusting a compressor guide blade or compressor guide blade row, which may also be an inlet guide blade (row). A term used in this context is a so-called turn-up or a turn-up operation of the gas turbine plant.

Due to the increase in the compressor intake air mass flow, not only an increase in output, but also an increase in the compressor pressure ratio of the gas turbine plant is achieved. As a result the material-dependent maximum allowable turbine entry temperature may be exceeded, which means that the turbine load may be inadmissibly high (so-called over-firing of the gas turbine). As a consequence material failure may occur/operation of the gas turbine plant may be impaired/may fail.

Various methods for operating a gas turbine plant with a compressor and a turbine are known from the state of the art, in particular with the aim of avoiding inadmissibly high turbine loads. With a known method, a maximum allowable turbine outlet temperature is fixed and a current turbine outlet temperature value is held below the maximum allowable turbine outlet temperature, wherein the maximum allowable turbine outlet temperature is constant, i.e. is fixed once, and refers to the base load operation of the gas turbine plant. Since the turbine entry temperature usually assumes values between 1200° and 1700° C. and therefore cannot be reliably detected by present measuring techniques, instead of the turbine entry temperature a turbine outlet temperature which is dependant thereon is recorded, which typically lies within the range of 400° C. to 700° C., and the gas turbine plant is controlled via this temperature.

According to the state of the art, if a gas turbine plant is operated on condition that a maximum allowable turbine entry temperature is adhered to, this places restrictions on its operation, in particular when operated in turn-up mode.

SUMMARY OF INVENTION

It is an object of the invention to propose an advantageous technical teaching method for operating a gas turbine plant with a compressor and a turbine. In particular the invention is based on the object of achieving operation of the gas turbine plant while adhering to a maximum allowable turbine entry temperature.

According to aspects of the invention this object is achieved by a method for operating a gas turbine plant having a compressor and a turbine, by an arrangement for controlling a gas turbine plant having a compressor and a turbine and a gas turbine plant having a compressor and a turbine with the characteristics of the respective independent claim. Convenient developments and advantages of the invention are revealed in the further claims and the description and refer to the method, the arrangement and the gas turbine plant.

The method involves identifying a limit value of a guide blade adjustment for the compressor of the gas turbine in dependence on at least one drive shaft speed.

For example the limit value of the guide blade adjustment may depend on the speed (number of revolutions) and may be identified in accordance with this variable.

The limit value of the guide blade adjustment may be a value, at which, when it is reached and/or exceeded and/or not reached, the function of the compressor/the gas turbine plant may be impaired. This limit value may e.g. be a limit value against so-called compressor pumping or a limit value against icing up of the compressor. The limit value may refer to an adjustment range of the guide blades, which when it is reached may lead to mechanical damage.

Guide blade adjustment may be an adjustment of a variable, i.e. of an adjustable compressor inlet guide blade (compressor inlet guide blade row). The adjustment is not necessarily limited to the compressor inlet guide blade/compressor inlet guide blade row, but may comprise further guide blade rows, in particular one to five further guide blade rows.

By identifying the limit value of the guide blade adjustment in dependence on the at least one drive shaft speed of the gas turbine plant, it is possible in a simple manner to achieve an optimal adaptation of the maximum allowable guide blade adjustment, i.e. of the limit value, to suit the prevailing conditions. For example, it is possible in this way, to easily identify a limit value, even for high compressor inlet temperatures of typically 20° C. to 50° C., which permits reliable turn-up operation of the gas turbine plant while by-passing so-called compressor pumping.

The term "identify", in the given context and in the following, is understood to mean, either indirectly or directly, a useful determination, a statement, a measurement or a calculation of a value.

For this at least one drive shaft speed a maximum allowable turbine entry temperature corresponding to the limit value of the guide blade adjustment for the compressor or a maximum allowable temperature dependent on the turbine entry temperature for the turbine of the gas turbine is identified.

For example identification of the maximum allowable turbine entry temperature is effected in direct dependence on the identified limit value of the guide blade adjustment. Thus identification can be effected indirectly in dependence on the drive shaft speed of the gas turbine, because the limit value of the guide blade adjustment itself can, in turn, depend on the drive shaft speed.

Advantageously, due to a thus dependent identification of the maximum allowable turbine entry temperature or maximum allowable temperature depending on the turbine entry temperature an over-firing or overheating of the turbine can be achieved even for fluctuating or changing operating conditions (drive shaft speed). This applies in particular to a turn-up operation of the gas turbine plant.

The gas turbine is operated taking into account the identified maximum allowable turbine entry temperature or the identified maximum allowable temperature.

Particularly advantageously therefore an operation of the gas turbine can be achieved, in particular above the base load, i.e. with increased output (in turn-up operation), while avoiding an increase in thermal turbine load. This in turn makes it possible to achieve—in particular in the case of a turn-up operation—a particularly economic and reliable operation of the gas turbine plant.

In addition the invention provides for an arrangement for controlling a gas turbine plant having a compressor and a turbine. The arrangement comprises an identification apparatus, which is configured such that the method according to the invention or further developments thereof can be carried out.

The identification apparatus can be prepared to in particular identify at least one drive shaft speed of the gas turbine plant. That is, the identification apparatus of the arrangement advantageously comprises a measuring means/sensors, which are prepared for identifying the drive shaft speed for example. The identification apparatus in addition is configured such that the limit value of the guide blade adjustment and/or the maximum allowable turbine entry temperature or the maximum allowable temperature depending on the turbine entry temperature can be identified.

Due to the arrangement a simple implementation of the method or the conversion thereof into an operation (or mode of operation) of the gas turbine plant can be achieved.

Moreover the invention provides for a gas turbine plant with a compressor and a turbine. A particularly advantageously operable gas turbine plant can be achieved if it has an arrangement according to the invention or one of its further developments/executes the method according to the invention or one of its further developments.

Further developments of the invention are also revealed in the dependent claims. The further developments refer to the method according to the invention, to the arrangement according to the invention and to the gas turbine plant according to the invention.

The invention and the described further developments can be realized in software as well as in hardware, for example using a special electrical circuit.

Furthermore, realization of the invention or of a described further development is possible using a computer-readable storage medium, on which a computer program is stored, which executes the invention or the further development.

Also the invention and/or each described further development can be realized by a computer program product, which comprises a storage medium, on which a computer program is stored, which executes the invention and/or the further development.

The drive shaft speed for a multi-shaft gas turbine plant may be the number of revolutions (speed) of the compressor drive shaft or the turbine drive shaft, in particular a so-called mechanical speed.

According to a further development the limit value of the guide blade adjustment for the compressor of the gas turbine is a limit value against an impairment of the operation of the gas turbine plant.

The limit value may be an upper or a lower limit value. If the limit value is adhered to in operation of the gas turbine plant, it is possible, in a simple manner, to achieve that an impairment of the operation due to an inadmissible guide blade adjustment is avoided or prevented.

In an advantageous further development the limit value against an impairment of the operation of the gas turbine plant is a limit value against compressor pumping or a limit value against compressor icing-up.

So-called compressor pumping can occur, in particular, with an operation of the gas turbine plant at a compressor inlet temperature above 20° C., in particular in the temperature range between 20° C. and 50° C., and in dependence on the guide blade adjustment (turn-up) and this may lead to damage of the compressor/the gas turbine plant.

If the limit value is adhered to during operation of the gas turbine plant it is possible in a simple manner to avoid or prevent compressor pumping.

So-called compressor icing-up may occur in dependence on the compressor inlet temperature, compressor inlet moisture and guide blade adjustment, in particular at low temperatures and high moisture values and may lead to an impairment of the gas turbine integrity/to a failure of the gas turbine plant.

If the limit value is adhered to during operation of the gas turbine plant it is possible in a simple manner to avoid or prevent compressor icing-up.

In an advantageous embodiment the maximum allowable turbine entry temperature or the maximum allowable temperature depending on the turbine entry temperature is identified in dependence on the drive shaft speed and/or the limit value of the guide blade adjustment.

The maximum allowable turbine entry temperature or the maximum allowable temperature depending on the turbine entry temperature may be identified, for example, in dependence on the drive shaft speed. Thus an identification corresponding to the identification of the limit value of the guide blade adjustment can be effected in a simple way. In addition it is possible, advantageously, to refer back to the same operating conditions (drive shaft speed), which for example may have been stored in, and may be retrieved from, a process control of the gas turbine plant as number values or data.

In an advantageous further development the maximum allowable temperature is a turbine outlet temperature.

The turbine outlet temperature may typically lie in the range of 400° C. to 700° C., and thus distinctly below the turbine entry temperature in the range of 1200° to 1700° C. The turbine outlet temperature may be a so-called corrected turbine outlet temperature (TOTC: turbine outlet temperature corrected), the identification of which involves a correction value, which is for example dependent on the ambient temperature.

There exists an at least indirect connection between the turbine outlet temperature/the corrected turbine outlet temperature and the turbine entry temperature, which allows conclusions to be drawn from the turbine outlet temperature as to the turbine entry temperature, and vice-versa. Advantageously this allows a measurement-based identification of the relatively lower turbine outlet temperature using commonly used, low-cost and reliable means.

According to a further design the method is performed for a plurality of predefinable points in time.

Typically the method is thus performed for a period of time in such a way that at a certain time t1, in dependence on at least one drive shaft speed of the gas turbine plant, the limit value of the guide blade adjustment and the maximum allowable turbine entry temperature or the turbine outlet temperature is identified. Conveniently the gas turbine plant is operated during a period of time t2-t1 at the thus identified limit value/while adhering to the thus identified maximum allowable temperature value. At a point in time t2 renewed identification is performed in dependence on the then current (i.e. the possibly changed (in comparison to t1)) operating conditions (drive shaft speed). In this way it is possible to achieve a particularly good adaptation of the operation of the gas turbine plant to operating conditions which vary over time.

Advantageously the predefinable points in time lie within a turn-up operation of the gas turbine plant. In this way it is advantageously possible to prevent over-firing of the gas turbine during the thermally critical phase of turn-up.

In a further embodiment of the invention it is proposed that the method is used for controlling and regulating the operation of the gas turbine plant.

Thus, by using the control and regulating means, it is possible in a simple way, to achieve adherence to the maximum allowable turbine entry temperature and to avoid an over-firing of the gas turbine, in particular when increasing output through turn-up operation.

The description given of the advantageous designs up to now contains numerous features, which are reflected in the individual sub-claims, where sometimes several features are combined. These features can, however, where convenient, be considered on their own and combined to form meaningful further combinations. Advantageously these features can be combined, individually or in any suitable combination, with the method according to the invention, the arrangement according to the invention and the gas turbine plant according to the invention, in accordance with the dependent claims.

The above described properties, features and advantages as well as the way in which they are achieved, become clearer and more easily understandable in conjunction with the description given hereunder of the exemplary embodiments, which are explained in detail with reference to the drawings. The exemplary embodiments merely serve the purpose of explanation and do not limit the invention to the combination of features cited therein, also not with reference to functional features. In addition, suitable features of each exemplary embodiment can be considered individually in isolation, can be removed from an exemplary embodiment, can be inserted into another exemplary embodiment as a supplement, and/or can be combined with any of the claims.

DETAILED DESCRIPTION OF INVENTION

Figure 1:
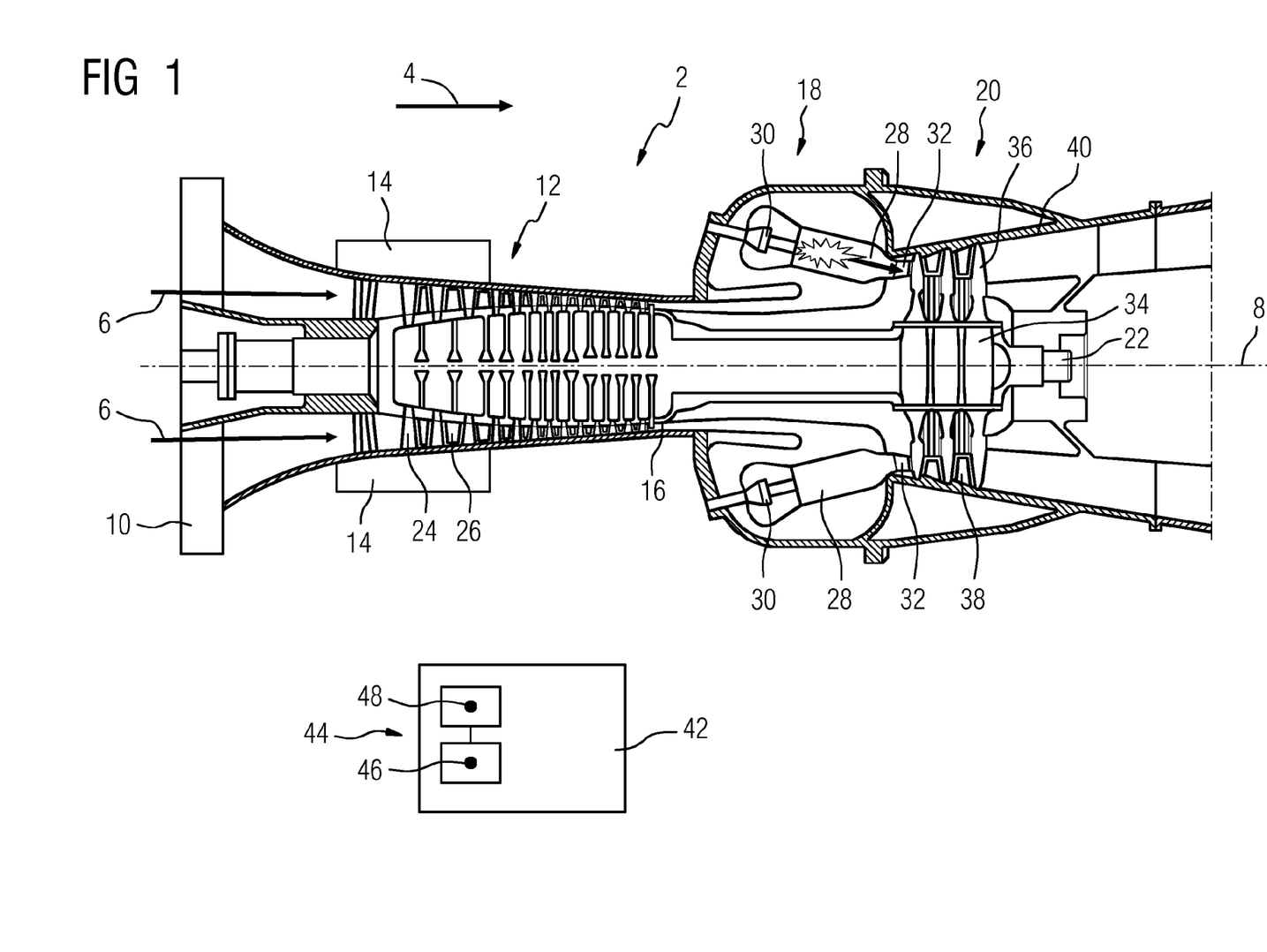
FIG. 1 shows a sectional view through a gas turbine plant according to the invention with an arrangement for controlling the gas turbine plant.

FIG. 1 shows a schematic view of a gas turbine plant 2. In the following text the terms gas turbine plant and gas turbine are used as equivalents. The gas turbine 2, in the main flow direction 4 of a flow medium 6 such as air, or in the longitudinal direction of a rotational axis 8, comprises, inter alia, a compressor inlet 10, a compressor 12, a guide blade adjustment means 14, a compressor outlet 16, a burner unit 18 and a turbine or turbine unit 20.

The guide blade adjustment means 14, in the given exemplary embodiment, is shown in two pieces/is realized as being rotation-symmetric to the rotational axis 8, which of course does not, of necessity, have to be the case.

In addition the gas turbine comprises a drive shaft 22, which is rotatable about the rotational axis 8 and extends along the gas turbine 2 in the longitudinal direction. The drive shaft 22 connects the turbine unit 20 with the compressor 12 in a fixed-drive/non-rotatable manner.

The compressor 12 comprises a sequence of axially arranged compressor guide blade stages 24 and compressor blade stages 26. At least one stage or one row of compressor guide blades is prepared for adjusting, i.e. twisting against the main flow direction 4 of the flow medium 6, by means of the guide blade adjustment means 14.

During an operation of the gas turbine 2 the flow medium 6 enters the compressor 12 through the compressor inlet 10. The flow medium 6 is compressed in the compressor 12 and thereby heated to between 300° C. and 500° C. The compressed flow medium 6 is admitted via the compressor outlet 16 to the burner unit 18, which for example may be realized in the form of a ring burner unit. The burner unit 18 comprises one or more combustion chambers 28, each with a burner 30.

The compressed flow medium 6 coming from the compressor 12 is directed, at least proportionally, into the burner unit 18 or the combustion chamber 28 and mixed in there with a gaseous or liquid fuel. The ignitable mixture formed thus in the burner unit 18 is then ignited/burned, and the fuel gas or the working gas of the combustion is directed via a transition channel 32 to the turbine unit 20 of the gas turbine 2.

The turbine unit 20 comprises a number of turbine wheels 34 connected to the drive shaft 22 with turbine blades 36. In addition turbine guide blades 38 are axially arranged between the turbine wheels 34. The turbine guide blades 38 of the turbine unit 20 are in turn connected to a stator 40.

The combustion gas from the one or more combustion chambers 28 enters through the transition channel 32 into the turbine unit 20 and drives the turbine blades 36 in such a way as to rotationally drive the drive shaft 22 thus generating a torque about the rotational axis 8 of the gas turbine 2. The turbine guide blades 38 serve to direct the combustion gas/the working gas onto the turbine blades 36, i.e. they serve to guide the flow.

The compressor blade stages 26 are driven by the drive shaft 22, i.e. by the torque generated in the turbine unit 20 and set into rotation about the rotational axis 8, wherein the compressed flow medium 6 is generated by the gas turbine 2 itself, as soon as this is in a corresponding operating state.

The gas turbine 2 further comprises a control arrangement 42, which for better illustration is shown in FIG. 1 outside/constructionally separated from the gas turbine 2. The control arrangement 42 comprises an identification apparatus 44. The control arrangement 42 serves, inter alia, to control an operation of the gas turbine 2.

The identification apparatus 44 is prepared for identification of at least one operating condition (drive shaft speed) of the gas turbine plant 2. In the exemplary embodiment given the identification apparatus 44 of the control arrangement 42 is prepared for an identification of the compressor inlet temperature and/or the compressor inlet moisture and/or a speed of the drive shaft 22. The identification apparatus is in addition configured such that the limit value 46 of the guide blade adjustment and the maximum allowable turbine outlet temperature value 48 can be identified.

The control arrangement 42 can be prepared to activate the guide blade adjustment means 14 in order to initiate an adjustment of the compressor guide blade stages 24 against the main flow direction 4.

Figure 2:
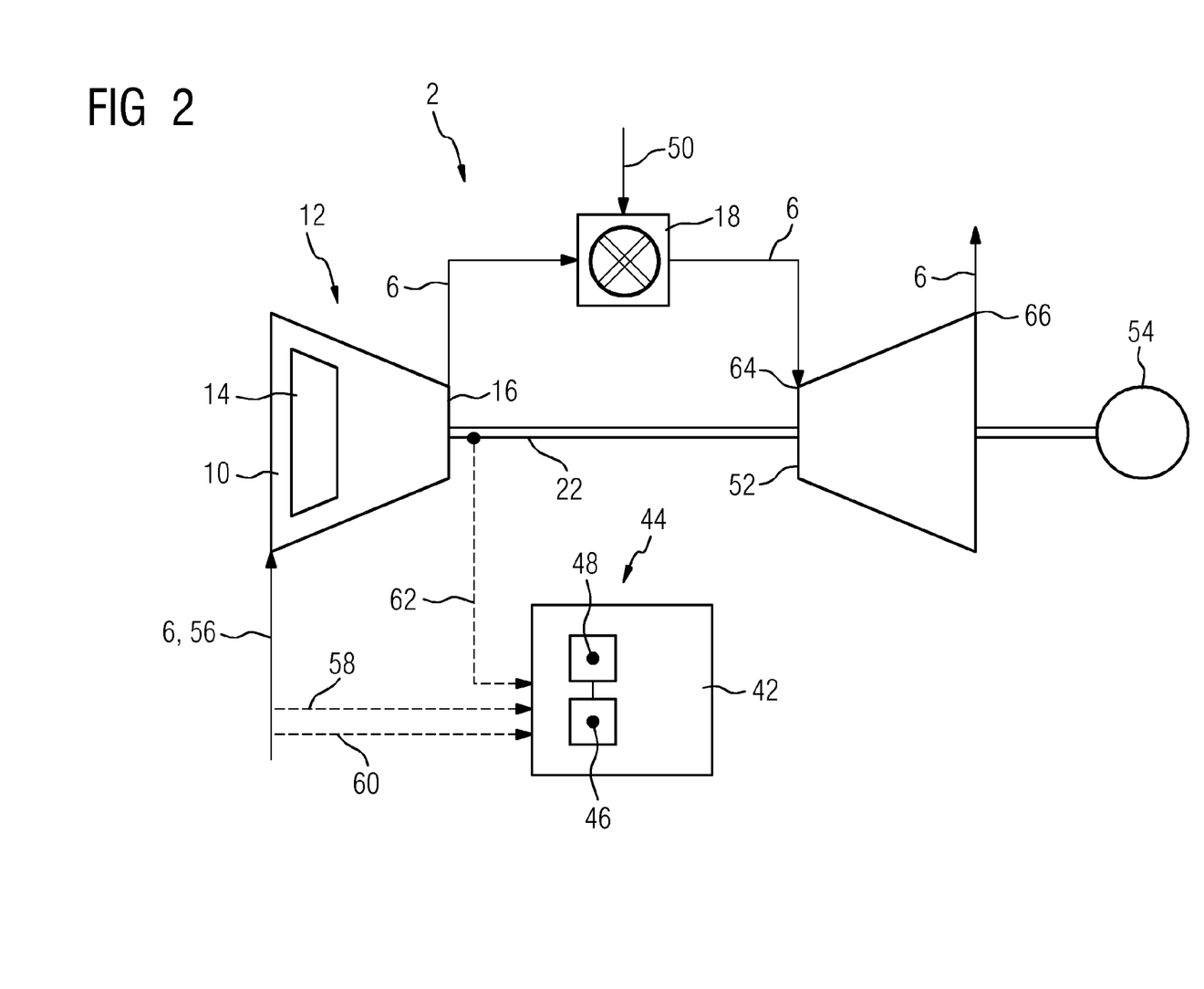
FIG. 2 shows a schematic view of a control of the operation of the gas turbine plant.

A schematic view of a control of the operation of the gas turbine plant 2 is shown in FIG. 2 and will now be described. During an operation of the gas turbine plant 2 the flow medium 6 flows from an environment not described in detail into the compressor inlet 10 of the compressor 12 of the gas turbine plant 2. The flow medium 6 is compressed in the compressor 12, leaves the compressor 12 via the compressor outlet 16 and then reaches the burner unit 18.

In the burner unit 18 an ignitable mixture is produced from the compressed flow medium 6 by admitting a fuel mass current 50, for example a mass current of a gas, and ignited, wherein ignition is in particular continuous.

The ignited flow medium 6 leaves the burner unit 18 in main flow direction 4 (see FIG. 1) and enters the turbine unit 20 of the gas turbine plant 2 via the turbine entry 52 and sets the turbine wheels 34 (see FIG. 1) into rotation, such that a torque is transferred to the drive shaft 22.

An output of the gas turbine plant 2 resulting from the torque generated in this way and the speed of the drive shaft 22 is transferred in part to the compressor 12 mounted on the drive shaft side for performing compression work. Another part of the output of the gas turbine plant 2 is transferred to a generator 54 as effective output and is converted therein into electric energy.

Starting from a base load operation of the gas turbine plant 2 a so-called turn-up operation is then performed for operating the gas turbine plant 2 with an output above the base load, for example with 105% of the base load, in other words, the suction air mass current 56 is increased through an adjustment of the compressor inlet guide blades/one or more compressor guide blade stages 24 (see FIG. 1). Adjustment of the compressor guide blade stages 24 is effected by activating the guide blade adjustment means 14.

The identification apparatus 44 of the control arrangement 42 detects or identifies a temperature value (the "temperature") and a moisture value/a moistness value (the "moisture", "moistness") of the flow medium 6 entering at the compressor inlet 10, i.e. a compressor inlet temperature 58 and a compressor inlet moisture 60. Identification of the compressor inlet moisture 60 and the compressor inlet temperature 58 may e.g. be effected via correspondingly suitable sensors or via other measuring means, wherein the sensors or the measuring means may also be an integral component of the control arrangement 42. In addition the identification apparatus 44 detects or identifies the speed of the drive shaft 22, i.e. a drive shaft speed 62. In the case of a multi-shaft realization of the gas turbine plant 2 a speed of a shaft other than the drive shaft 22 may be identified instead of or in addition to, the drive shaft speed 62.

In the exemplary embodiment given the identification apparatus 44 identifies the guide blade adjustment limit value 46 in dependence on the compressor inlet temperature 58 and the drive shaft speed 62. The guide blade adjustment limit value 46 is a limit value of the adjustment of the compressor guide blades 24 of the compressor 12, at which, when it is reached, exceeded, or not reached, the so-called compressor pumping is to be expected. Normally compressor pumping occurs more frequently at a raised compressor inlet temperature 58, in particular within a range of 20° C. to 50° C.

In addition the identification apparatus 44 identifies the maximum allowable turbine outlet temperature value 48 in dependence on the compressor inlet temperature 58 and the drive shaft speed 62. Alternatively the maximum allowable turbine outlet temperature value 48 may also be identified in dependence on the guide blade adjustment limit value 46.

By identifying the maximum allowable turbine outlet temperature value 48, adherence to a maximum allowable turbine entry temperature 64, which depends on a turbine outlet temperature 66, can be achieved in a turn-up operation of the gas turbine plant 2 by using downstream processing in the control arrangement/in a process control system of the gas turbine plant 2.

Figure 3:
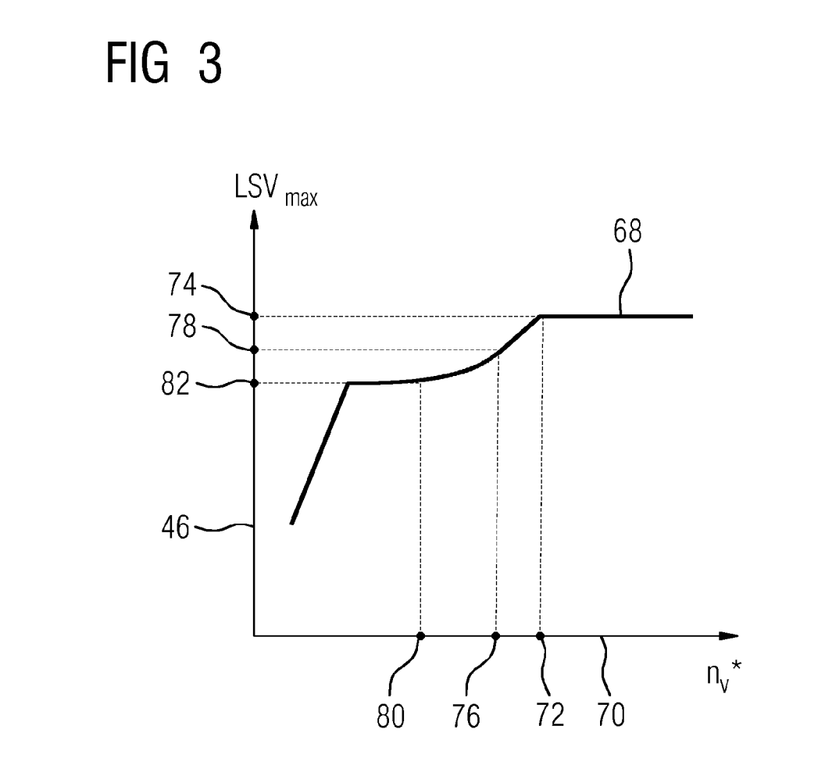
FIG. 3 shows a diagram with a curve progression of the guide blade adjustment limit value in dependence on a variable nv.

FIG. 3 shows a diagram with a curve progression 68 of the guide blade adjustment limit value 46 (ordinate [%]) identified by the identification apparatus 44 (see FIG. 1, 2) in dependence on a variable nv 70 (abscissa [ ]). The variable nv is a variable which can be identified in dependence on the compressor inlet temperature 58 and the drive shaft speed 62 (see FIG. 2). Alternatively identification of the guide blade adjustment limit value 46 may be effected directly in dependence on the compressor inlet temperature 58 and the drive shaft speed 62.

According to the curve progression 68 an nv value 72 identified in the given exemplary embodiment for a compressor inlet temperature 58 of 20° C. and a drive shaft speed 62 of 60 Hz, results in a guide blade adjustment limit value 74. A reduced nv value 76 results in a guide blade adjustment limit value 78, wherein the nv value 76 corresponds to a compressor inlet temperature 58 of 27° C. and a drive shaft speed 62 of again 60 Hz. A further reduced nv value 80 results in a guide blade adjustment limit value 82, wherein the nv value 80 corresponds to a compressor inlet temperature 58 of 50° C. and a drive shaft speed 62 of again 60 Hz. Therefore, for an unchanged drive shaft speed 62 and a compressor inlet temperature 58 rising from 20° C. (72), over 27° C. (76) to 50° C. (80), the guide blade adjustment limit value 46, drops—i.e. for a decreasing nv 70.

Expressed in simplified terms, for an increasing compressor inlet temperature 58, in particular above 20° C. (i.e. below the nv value 72), only smaller guide blade adjustments are allowable in order to prevent compressor pumping. Below a compressor inlet temperature 58 of 20° C. (i.e. above the nv value 72) a constant guide blade adjustment limit value 74 prevails according to the curve progression 68.

Figure 4:
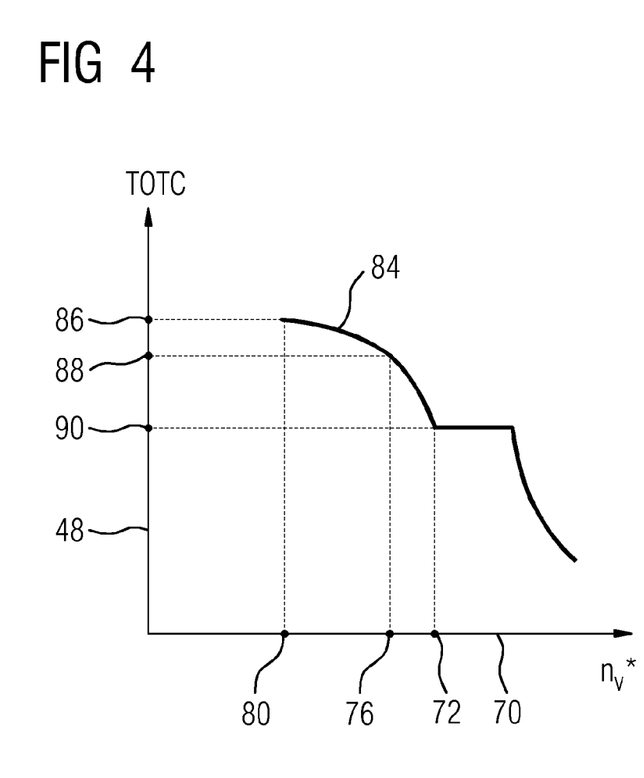
FIG. 4 shows a diagram with a curve progression of the maximum allowable turbine outlet temperature value in dependence on the variable nv.

FIG. 4 shows a diagram with a curve progression 84 of the maximum allowable turbine outlet temperature value 48 (ordinate [° C.]) identified by the identification apparatus 44 (see FIG. 1, 2) in dependence on the variable nv 70 (abscissa [ ]). The nv values 72, 76 and 80 are identical with the values shown in FIG. 3.

Starting from an nv value 80 and a maximum allowable turbine outlet temperature value 86, falling maximum allowable turbine outlet temperature values (88, 90) occur for a rising nv (76, 72). The curve progression 84 between the nv values 80 and 72 is non-linear. Above the nv value 72, i.e. below a compressor inlet temperature 58 of 20° C. for an unchanged drive shaft speed 64 of 60 Hz, the maximum allowable turbine outlet temperature value 90 remains constant within a certain range, wherein the drive shaft speed 64 may be a speed different from 60 Hz, in particular 50 Hz. Therefore higher turbine outlet temperatures 66 are allowable as the compressor inlet temperature 58 rises.

Figure 5:
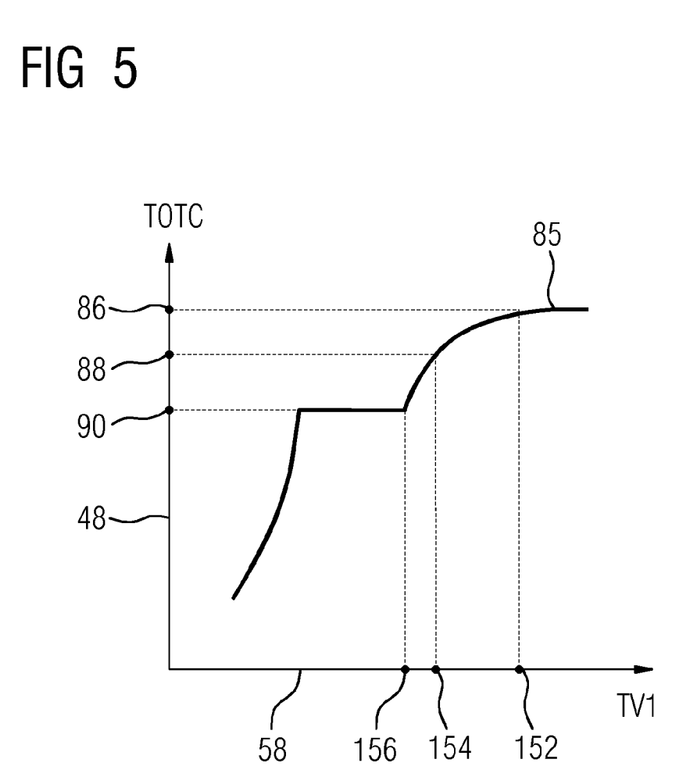
FIG. 5 shows a diagram with a curve progression of the maximum allowable turbine outlet temperature value in dependence on the compressor inlet temperature.

FIG. 5 shows a diagram with a curve progression 85 of the maximum allowable turbine outlet temperature value 48 (ordinate [° C.]) in dependence on the compressor inlet temperature 58 (abscissa [° C.]). The maximum allowable turbine outlet temperature values 86, 88 and 90 are identical to the values indicated in FIG. 4.

Starting from a compressor inlet temperature value 152 of 50° C. and a maximum allowable turbine outlet temperature value 86, as the compressor inlet temperature (154, 156) drops, the maximum allowable turbine outlet temperature values (88 (27° C.), 90 (20° C.)) drop. The curve progression 85 between the compressor inlet temperature values 152 (50° C.) and 156 (20° C.) is non-linear. Below the compressor inlet temperature value 156 of 20° C. for an unchanged drive shaft speed 64 of 60 Hz, the maximum allowable turbine outlet temperature value 90 remains constant within a certain range, wherein the drive shaft speed 64 may be different from 60 Hz, in particular it may be 50 Hz.

Figure 6:
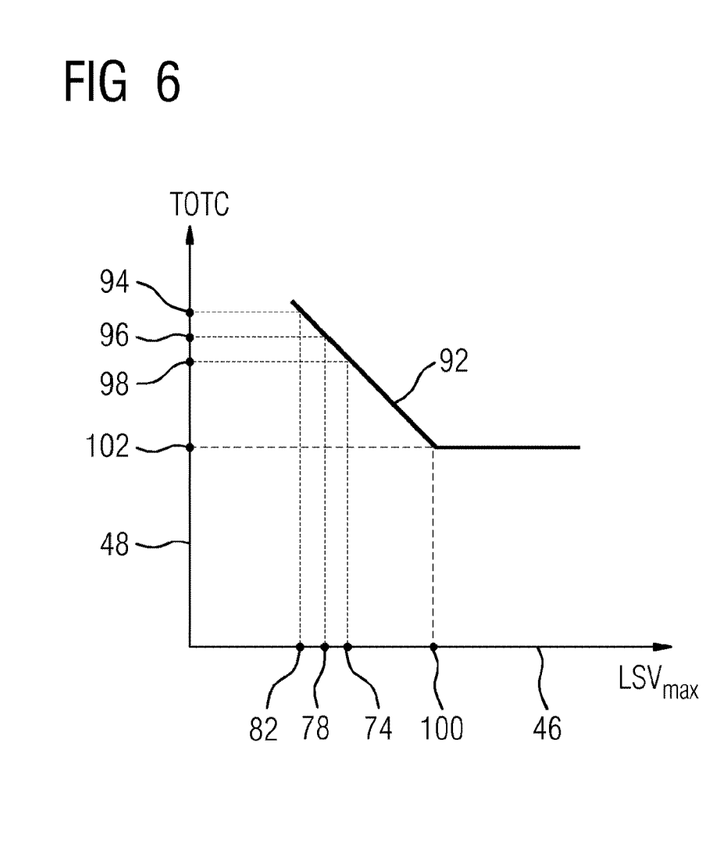
FIG. 6 shows a further diagram with a curve progression of the maximum allowable turbine outlet temperature value in dependence on the guide blade adjustment limit value.

FIG. 6 shows a further diagram with a curve progression 92 of the maximum allowable turbine outlet temperature value 48 (ordinate [° C.]), which may be identified by the identification apparatus 44 (see FIG. 1, 2). In this exemplary embodiment, identification, in contrast to the exemplary embodiment shown in FIG. 4, is effected in dependence on the guide blade adjustment limit value 46 (abscissa [%]). The guide blade adjustment limit values 82, 78 and 74 are identical to the values shown in FIG. 3.

Starting from a guide blade adjustment limit value 82 and a maximum allowable turbine outlet temperature value 94 falling maximum allowable turbine outlet temperature values (96, 98) are experienced for a rising guide blade adjustment limit value (78, 74). The curve progression 92 between the guide blade adjustment limit values 82 and 100 is linear. Above the guide blade adjustment limit value 100 the maximum allowable turbine outlet temperature value 102 remains constant.

Expressed in simplified terms, a rising turn-up or rising guide blade adjustment limit value 46 results in lower maximum allowable turbine outlet temperature values 48.

Figure 7:
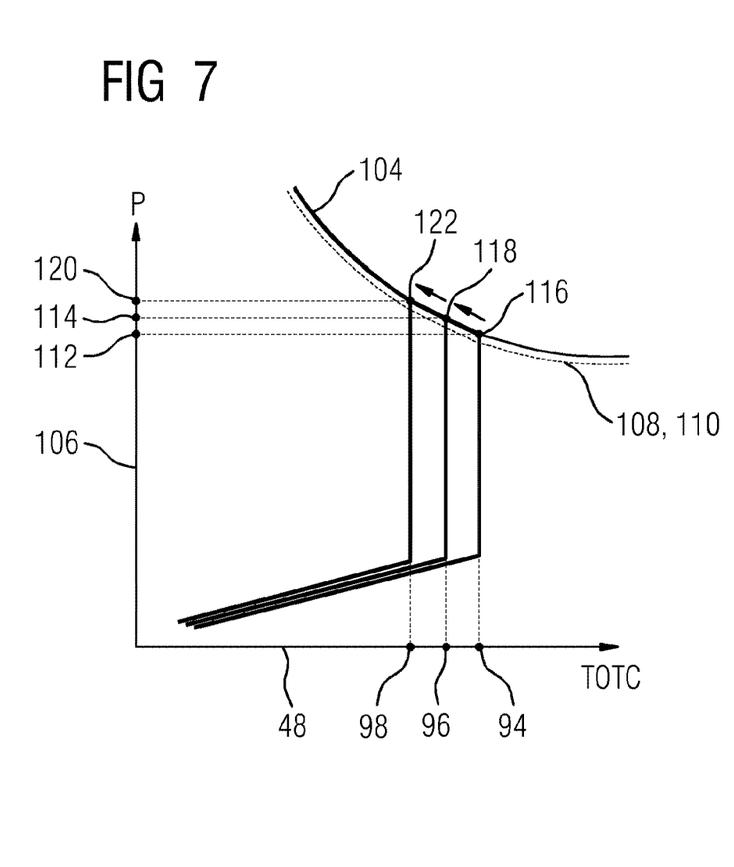
FIG. 7 shows a diagram with a curve progression of the output of the gas turbine plant in dependence on the maximum allowable turbine outlet temperature value.

FIG. 7 shows a diagram with a curve progression 104 of the output 106 of the gas turbine plant (ordinate [MW]) in dependence on the maximum allowable turbine outlet temperature value 48 (abscissa [° C.]). The curve progression 104 of the output 106 is achieved by adhering to a maximum allowable turbine entry temperature value 108 represented by the isotherm 110 as a dotted line. The noted down turbine outlet temperature values 94, 96 and 98 are identical to the values given in FIG. 5.

The diagram shown in FIG. 6 makes it clear, how by influencing the maximum allowable turbine outlet temperature value 48 an increase in output of the gas turbine plant 2 (see FIG. 1, 2) can be achieved while adhering to the maximum allowable turbine entry temperature value 108/ keeping it constant.

Starting from a turbine outlet temperature value 94 and an output of the gas turbine plant 2 with an output value 112, an increase in output is achieved by increasing the mass current by opening the guide blade, whilst as a result of decreasing the TOTC an over-firing of the turbine is prevented/adherence to the allowable turbine entry temperature is ensured. Both the state 116 and the state 118 lie on the isotherm 110, i.e. the maximum allowable turbine entry temperature value 108 is adhered to, while increasing the output from the value 112 to the value 114.

Furthermore starting from the turbine outlet temperature value 96 and the output value 114, by decreasing the turbine outlet temperature once again down to the turbine outlet temperature value 98, a further rise in output up to an output value 120 is achieved by opening the guide blade while adhering to the turbine entry temperature. The state 122 lies again on the isotherms 110, i.e. the maximum allowable turbine entry temperature value 108 is adhered to even during the rise in output from the value 114 to the value 120.

In consequence the rise in output from the value 112 to the value 120 is achieved while by-passing an additional thermal stress on the turbine unit 20 of the gas turbine plant (see FIG. 1). This means that advantageously, operation of the gas turbine plant is possible, in particular also permanently in a so-called turn-up mode of operation, with reference to thermal stress on the turbine unit 20.

Figure 8:
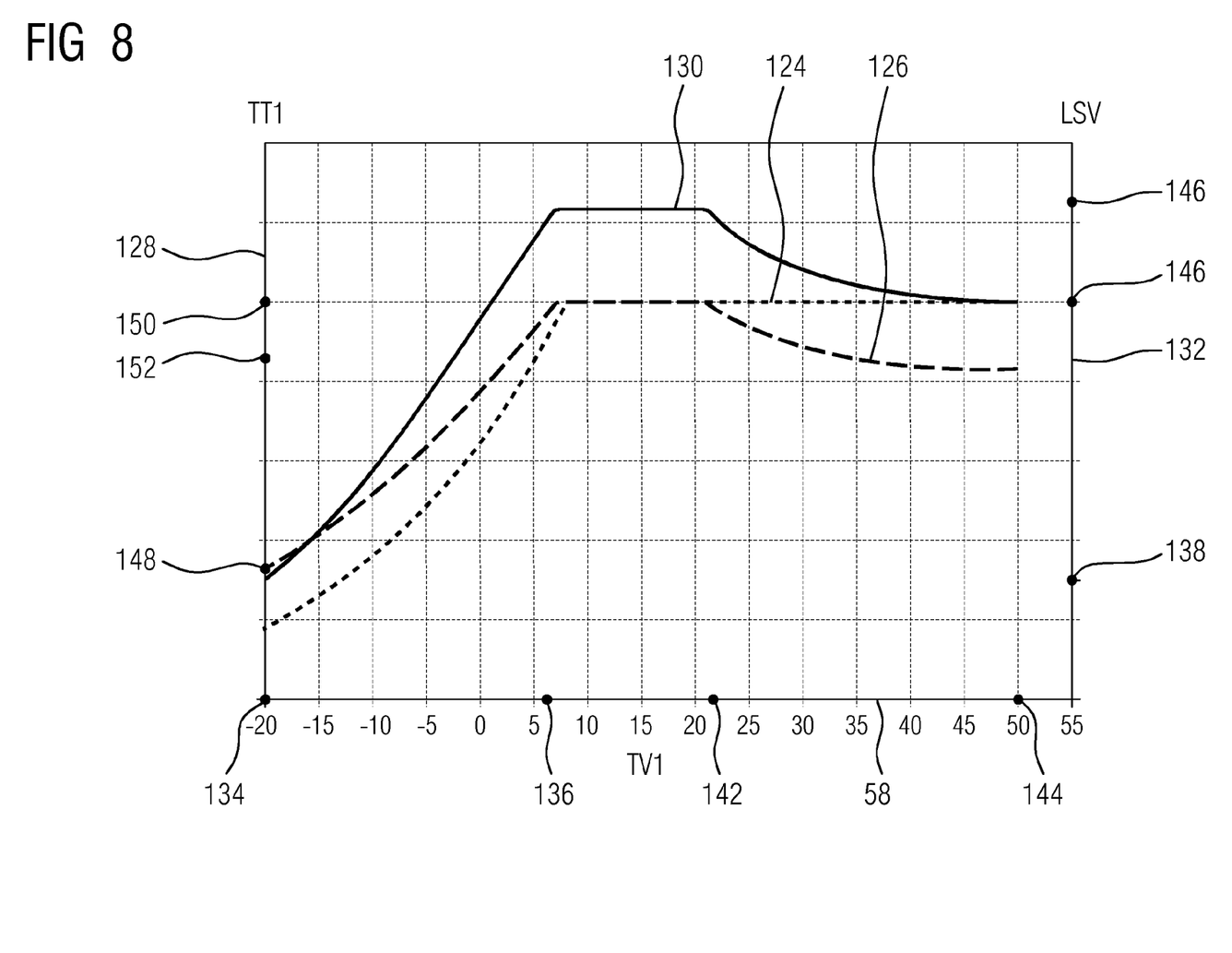
FIG. 8 shows a diagram with two curve progressions of a turbine entry temperature and a curve progression of the guide blade adjustment value, respectively over the compressor inlet temperature.

FIG. 8 shows a diagram with two curve progressions 124, 126 of a turbine entry temperature 128 (left-hand ordinate [° C.]) in dependence on the compressor inlet temperature 58 (abscissa [° C.]). In addition a further curve progression 130 of a maximum allowable guide blade adjustment value 132 (right-hand ordinate [%]), is plotted, again over the compressor inlet temperature 58 (abscissa [° C.]).

In the present exemplary embodiment a turn-up of the guide blade adjustment from a guide blade adjustment value 138 to a guide blade adjustment value 140 is effected over a rising compressor inlet temperature 58 from a compressor inlet temperature value 134 to a compressor inlet temperature value 136. For a further rise of the compressor inlet temperature 58 to a compressor inlet temperature value 142 no further turn-up is effected, i.e. the value of the guide blade adjustment is kept constant. Above the compressor inlet temperature value 142 an asymptotic reduction of the turn-up to a guide blade adjustment value 146 takes place up to a compressor inlet temperature value 144. Expressed in simple terms the guide blade adjustment is reduced in order to prevent or avoid compressor pumping.

The curve progression 126 of the turbine entry temperature 128 corresponds to the described curve progression 130 of the guide blade adjustment value 132: over the rising compressor inlet temperature 58, i.e. starting from the compressor inlet temperature value 134 up to the compressor inlet temperature value 136, the turbine entry temperature value 128 rises from a turbine entry temperature value 148 to a maximum allowable turbine entry temperature value 150.

With a further rise of the compressor inlet temperature 58 to the compressor inlet temperature value 142 no further increase in turbine entry temperature 128 takes place. I.e. the gas turbine is operated via a control of the maximum allowable turbine outlet temperature value 48 in dependence on the guide blade adjustment, the compressor inlet temperature 58 or the nv value (see FIG. 4, 5, 6, 7) such that over-firing of the turbine unit 20 (see FIG. 1) is avoided.

Above the compressor inlet temperature value 142 up to a compressor inlet temperature value 144 an asymptotic reduction of the turbine entry temperature 128 to a turbine entry temperature value 152 takes place. The reduction in turbine entry temperature 128 results from the reduction, via control and regulation means, of the maximum allowable turbine outlet temperature value 48 in dependence on the guide blade adjustment value 132.

The curve progression 124 shows a further control and regulation-based development, where even above the compressor inlet temperature value 142 the turbine entry temperature 128 can be kept constant, which is of advantage for the process. Keeping this temperature constant can be achieved by an alternative or extended identification of the maximum allowable turbine outlet temperature value 48.

The invention claimed is:

1. A method for operating a gas turbine plant comprising a compressor and a turbine, the method comprising:
    identifying a limit value of a guide blade adjustment for the compressor of the gas turbine plant associated with a drive shaft speed using first data that correlate limit values with control variables, wherein each control variable of the control variables is based on a respective drive shaft speed,
    identifying a maximum allowable turbine entry temperature, or a maximum allowable temperature that correlates to a turbine entry temperature, for the identified limit value using second data that correlate the limit values with the maximum allowable turbine entry temperature or with the maximum allowable temperature, and
    operating the gas turbine plant at the drive shaft speed without exceeding the maximum allowable turbine entry temperature or the maximum allowable temperature.

2. The method as claimed in claim 1,
    wherein the limit value of the guide blade adjustment for the compressor of the gas turbine plant is selected to prevent an impairment of the operation of the gas turbine plant.

3. The method as claimed in claim 2,
    wherein the impairment comprises compressor pumping or compressor icing-up.

4. The method as claimed in claim 1,
    wherein the maximum allowable turbine entry temperature or the maximum allowable temperature is identified in further dependence on:
    a compressor inlet temperature and/or
    a compressor inlet moisture.

5. The method as claimed in claim 1,
    wherein the method is performed respectively for a plurality of predefinable points in time.

6. The method as claimed in claim 5,
    wherein the plurality of predefinable points in time lie within a turn-up operation of the gas turbine plant.

7. The method as claimed in claim 1,
    further comprising controlling and regulating the operation of the gas turbine plant.

8. An arrangement for controlling a gas turbine plant comprising a compressor and a turbine, comprising:
    an identification apparatus configured to perform the method as claimed in claim 1.

9. A gas turbine plant comprising:
    a compressor and a turbine, and
    an arrangement as claimed in claim 8.

10. The method as claimed in claim 1, wherein each control variable is further based on a compressor inlet temperature.

11. The method as claimed in claim 1, wherein the identified limit value applies to at least one row of guide blades downstream of a row of inlet guide vanes.

* * * * *